(12) United States Patent
Astigarraga et al.

(10) Patent No.: US 9,170,906 B2
(45) Date of Patent: *Oct. 27, 2015

(54) BASE PROTOCOL LAYER TESTING DEVICE

(71) Applicant: International Business Machines Corporation, Armonk, NY (US)

(72) Inventors: Tara Astigarraga, Fairpoint, NY (US); Louie A. Dickens, Tucson, AZ (US); Carlos J. Lujan, Tucson, AZ (US); Daniel J. Winarski, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,715

(22) Filed: Sep. 30, 2014

(65) Prior Publication Data

US 2015/0019914 A1  Jan. 15, 2015

Related U.S. Application Data

(63) Continuation of application No. 13/921,460, filed on Jun. 19, 2013.

(51) Int. Cl.
*G06F 11/00* (2006.01)
*G06F 11/263* (2006.01)
*G06F 11/07* (2006.01)

(52) U.S. Cl.
CPC ............ *G06F 11/263* (2013.01); *G06F 11/079* (2013.01)

(58) Field of Classification Search
None
See application file for complete search history.

(56) References Cited

U.S. PATENT DOCUMENTS

| 5,864,658 | A | 1/1999 | Theobald | |
|---|---|---|---|---|
| 6,373,822 | B1 | 4/2002 | Raj et al. | |
| 6,922,395 | B1 | 7/2005 | Elliott et al. | |
| 7,933,953 | B2 | 4/2011 | Joung et al. | |
| 8,023,566 | B2 | 9/2011 | Schlueter | |
| 8,248,958 | B1 * | 8/2012 | Tulasi et al. | 370/250 |
| 8,402,388 | B2 | 3/2013 | Erhardt et al. | |
| 2006/0039538 | A1 | 2/2006 | Minnis et al. | |
| 2007/0248020 | A1 * | 10/2007 | Hoque et al. | 370/249 |
| 2014/0321285 | A1 * | 10/2014 | Chew et al. | 370/236 |

FOREIGN PATENT DOCUMENTS

WO  2012026881 A1  3/2012

OTHER PUBLICATIONS

Dawson, et al., "Testing of Fault-Tolerant and Real-Time Distibuted Systems via Preotocol Fault Injection," IEEE, 1996 Proceedings of Annual Symposium on Fault Tolerant Computing, Jun. 25-27, 1996; pp. 404-414.

* cited by examiner

*Primary Examiner* — Jason Bryan
(74) *Attorney, Agent, or Firm* — Cantor Colburn LLP (57) ABSTRACT

Embodiments relate to testing of a computing system using a base protocol layer testing device. An aspect includes, based on determining, by the base protocol layer testing device, that a current test comprises a test of a base protocol layer of the computing system, enabling a low level test assist device of the base protocol layer testing device for the current test, wherein the low level test assist device comprises a hardware device that is directly attached to an input/output (I/O) card of the computing system. Another aspect includes storing base protocol layer traffic that passes through the I/O card by the low level test assist device during performance of the current test by the base protocol layer testing device. Yet another aspect includes analyzing the stored base protocol layer traffic after completion of the current test to determine a result of the current test.

11 Claims, 5 Drawing Sheets

BASE PROTOCOL LAYER TESTING DEVICE

CROSS-REFERENCE TO RELATED APPLICATION

This application is a continuation of U.S. application Ser. No. 13/921,460 (Astigarraga et al.), filed on Jun. 19, 2013, which is herein incorporated by reference in its entirety.

BACKGROUND

The present disclosure relates generally to computing systems, and more specifically, to a base protocol layer testing device for use in a computing system.

In order to improve product quality for computing systems, extensive testing is required. A computing system or network may be made up of many different elements, and the interactions between those elements contribute to the overall quality of the computing system. The various elements of a computing system may communicate with one another via a multi-layer protocol. For example, network communication may be based on the seven-layer Open Systems Interconnection (OSI) model, which defines the functions of various protocol layers while not specifying the layer protocols themselves. The seven layers of the OSI model, sometimes referred to as Layer 7 through Layer 1, respectively, are the application, presentation, session, transport, network, data link, and physical layers.

An important computing system quality factor is interactions with the base protocol layers of the product (e.g., layers 1-3 of the OSI model). If there are problems in the base protocol layers of a computing system product, then the overall reliability of the product suffers. However, issues regarding the base protocol layers may be difficult to isolate and identify because such problems may be transient in nature and specific to the particular devices and network setup that is being tested. In order to account for these unique attributes, specialized testing tools such as traffic generators and jammers may be used in order to product, isolate, and identify base protocol layer problems. Such tools may be effective for identifying some protocol problems, but may not be suited for all protocol testing scenarios.

BRIEF SUMMARY

Embodiments include a method and computer program product for testing of a computing system using a base protocol layer testing device. An aspect includes, based on determining, by the base protocol layer testing device, that a current test comprises a test of a base protocol layer of the computing system, enabling a low level test assist device of the base protocol layer testing device for the current test, wherein the low level test assist device comprises a hardware device that is directly attached to an input/output (I/O) card of the computing system. Another aspect includes storing base protocol layer traffic that passes through the I/O card by the low level test assist device during performance of the current test by the base protocol layer testing device. Yet another aspect includes analyzing the stored base protocol layer traffic after completion of the current test to determine a result of the current test.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to a base protocol layer testing device. The base protocol layer testing device includes a specialized hardware module that is inserted into a port, such as a small form-factor pluggable (SFP) port, of an input/output (I/O) card of a computing device that is being tested. The specialized hardware module may be referred to as a low level test assist device. The low level test assist device captures the low level (i.e., base protocol layer) traffic that passes through the I/O card, which may not be visible to other elements of the computing system, and stores the captured traffic in a cache on the low level test assist device for analysis. The low level test assist device may also perform injection or modification of low level traffic that passes through the I/O card as required by the particular test that is being performed, allowing the lower layers of a protocol to be thoroughly tested. In various embodiments, the low level test assist device may be used in conjunction with a modified device driver for the I/O card in the computing system, which is specific to the low level test assist device and that is installed on the computing system in which the I/O card is located, and a post-processor; or in conjunction with an application-specific integrated circuit (ASIC) that is connected to the I/O card. In some embodiments, the base protocol layer testing device may be used to test layers 1, 2, and/or 3 (i.e., physical, data link, and/or network) of the communications protocol stack.

The base protocol layer testing device may be used in conjunction with any appropriate computing system, such as a storage area network (SAN), to identify and isolate problems in the base protocol layer. A SAN is an architecture in which remote computer storage devices are attached to servers (hosts) via respective I/O cards and a network in such a way that, to the operating system of the host, the storage devices appear as locally attached storage. Any appropriate end device in a SAN may be tested using a base protocol layer testing device that is associated with the I/O card of the end device.

The base protocol layer testing device may provide a cost effective, fully automated, and relatively fast and efficient way to find base protocol layer problems that affect the reliability of computing devices. The base protocol layer testing device may perform automated analysis of the captured base layer traffic, and indicate to a user whether the result of the test is pass or fail. Use of a fully automated base protocol layer testing device allows protocol testing may be performed anywhere and by anyone using the base protocol layer testing device. For example, a customer may perform protocol testing of a new computing device using a base protocol layer testing device that is configured for the particular new computing device before inserting the new computing device into the customer's production level network, or a developer may use the base protocol layer testing device to test code updates during development.

Figure 1:
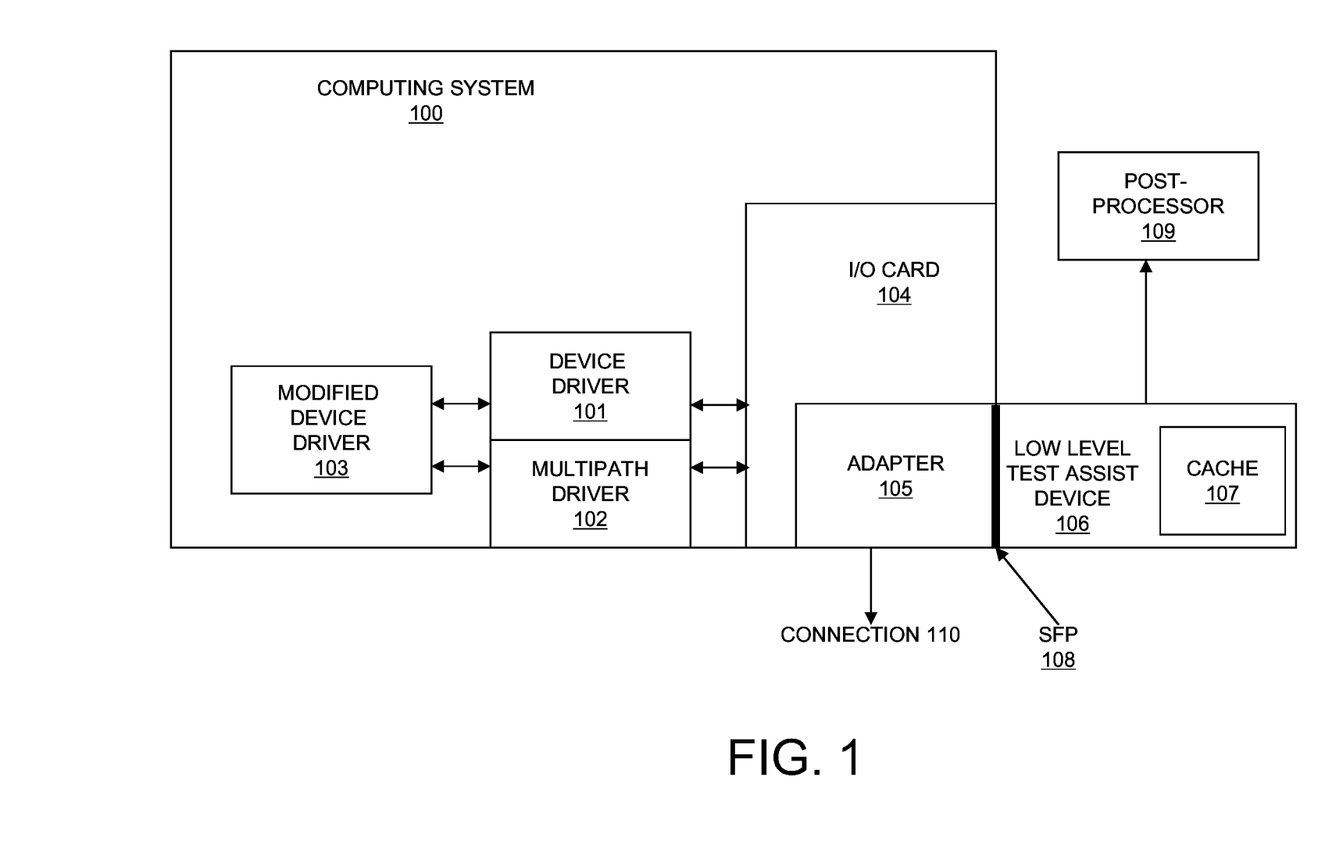
FIG. 1 is block diagram of a computing system including a base protocol layer testing device in accordance with an embodiment.

FIG. 1 shows an embodiment of a computing system 100 including a base protocol layer testing device. Computing system 100 includes an I/O card 104 having an adapter 105 for communication with another computing device, network, or system via connection 110. In some embodiments, computing system 100 may be part of a SAN. The computing system 100 operates adapter 105 via device driver 101 and multipath driver 102, which may be software on the computing system 100. The base protocol layer testing device shown in FIG. 1 that may be used to test the base protocol layers of computing system 100 comprises modified device driver 103, low level test assist device 106, and post-processor 109. The modified device driver 103 adds additional code to, and/or modifies the code in, the device driver 101, multipath driver 102, and/or firmware of the adapter 105. Modified device driver 103 enables operation of low level test assist device 106 in computing system 100, which comprises a hardware module that is connected to I/O card 104; in some embodiments the low level test assist device 106 may be plugged into SFP port 108 on the I/O card 104. The modified device driver 103 may be used to perform upper and lower layer protocol testing of the I/O card 104. The low level test assist device 106 is used in conjunction with modified device driver 103 to perform testing of the lower protocol layers, which may include in-line error injection and/or traffic modification, of the I/O card 104. A cache 107 in the low level test assist device 106 captures and stores incoming and outgoing base protocol layer traffic that passes through the I/O card 104. This captured traffic may not be visible to the device driver 101, multipath driver 102, or modified device driver 103. Once captured, the traffic in cache 107 may be automatically analyzed by post-processor 109, which may be located in computing system 100 in some embodiments, or may be located externally to computing system 100 in other embodiments, to identify any non-conformance issues which could include such things as: any protocol violations, interoperability problems, performance issues, and erratic behaviors. The post-processor 109 may also indicate whether a result of a test is pass or fail after performing the analysis.

Figure 2:
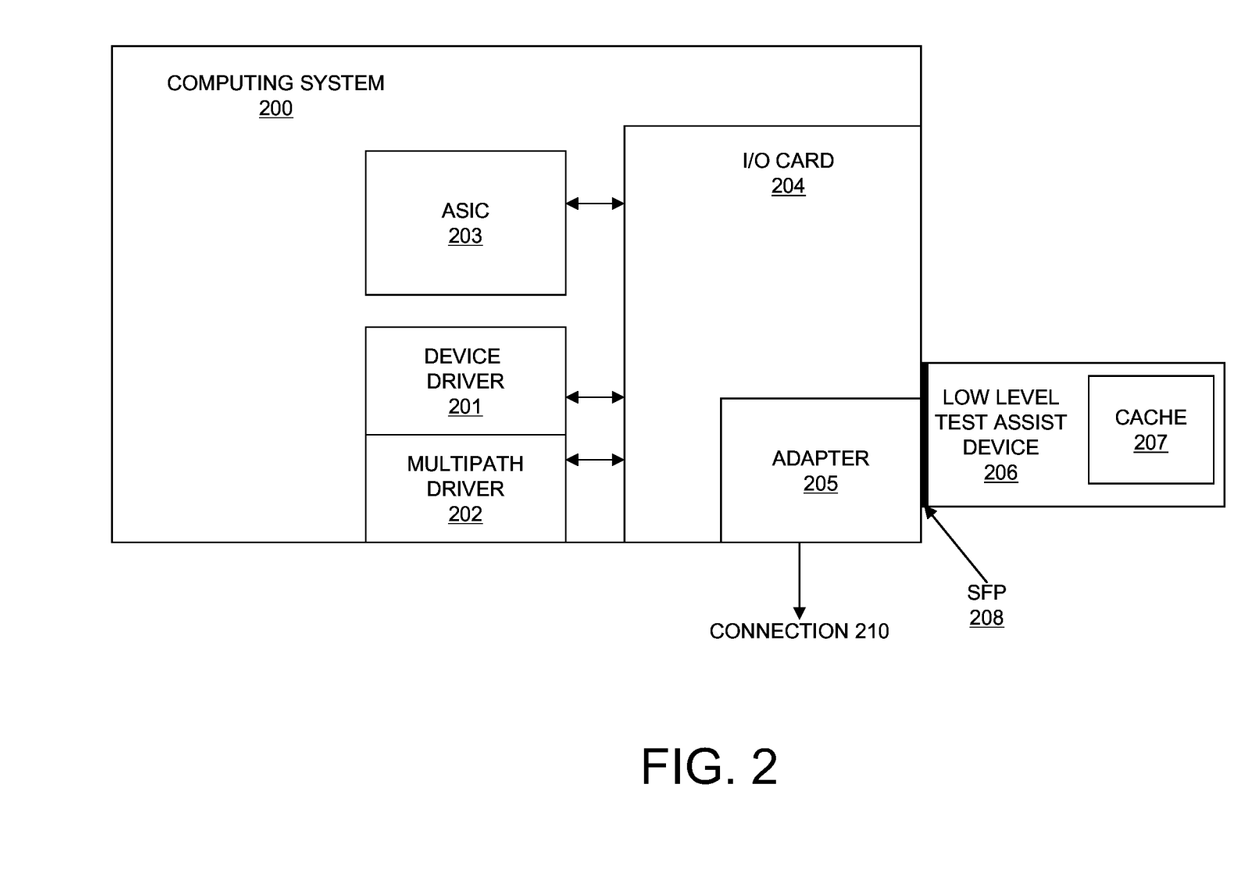
FIG. 2 is a block diagram of a computing system including a base protocol layer testing device in accordance with another embodiment.

FIG. 2 shows another embodiment of a computing system 200 including a base protocol layer testing device. Computing system 200 includes an I/O card 204 having an adapter 205 for communication with another computing device, network, or system via connection 210. In some embodiments, computing system 200 may be part of a SAN. The computing system 200 operates adapter 205 via device driver 201 and multipath driver 202, which may be software on the computing system 200. The base protocol layer testing device shown in FIG. 2 that may be used to test the base protocol layers of computing system 200 comprises ASIC 203 and low level test assist device 206. ASIC 203 is added to computing system 200, and enables operation of low level test assist device 206. The ASIC 203 may be used to perform upper and lower layer protocol testing of the I/O card 204. In computing system 200, the software/firmware stack comprising device driver 201 and multipath driver 202 of the I/O card 204 is unmodified, and the testing does not place additional load on the I/O card 204. Low level test assist device 206 comprises a hardware module that is connected to I/O card 204; in some embodiments the low level test assist device 106 may be plugged into SFP port 208 on the I/O card 204. The low level test assist device 206 is used in conjunction with ASIC 203 to perform testing, which may include in-line error injection and/or traffic modification, of the I/O card 204. A cache 207 in the low level test assist device 206 captures and stores incoming and outgoing traffic that passes through the I/O card 204. This captured traffic may not be visible to the device driver 201, multipath driver 202, or ASIC 203. Once captured, the traffic in cache 207 may be automatically analyzed by ASIC 203 to identify any non-conformance issues which could include such things as: any protocol violations, interoperability problems, performance issues, and erratic behaviors. The ASIC 203 may also indicate whether a result of a test is pass or fail after performing the analysis. In some embodiments, the ASIC 203 and the low level test assist device 206 may be located on the same piece of hardware that is plugged into the SFP port 208. In further embodiments, the ASIC 203 and the low level test assist device 206 may be used in conjunction with a post-processor to analyze the captured base layer traffic as was discussed above with respect to FIG. 1.

Figure 3:
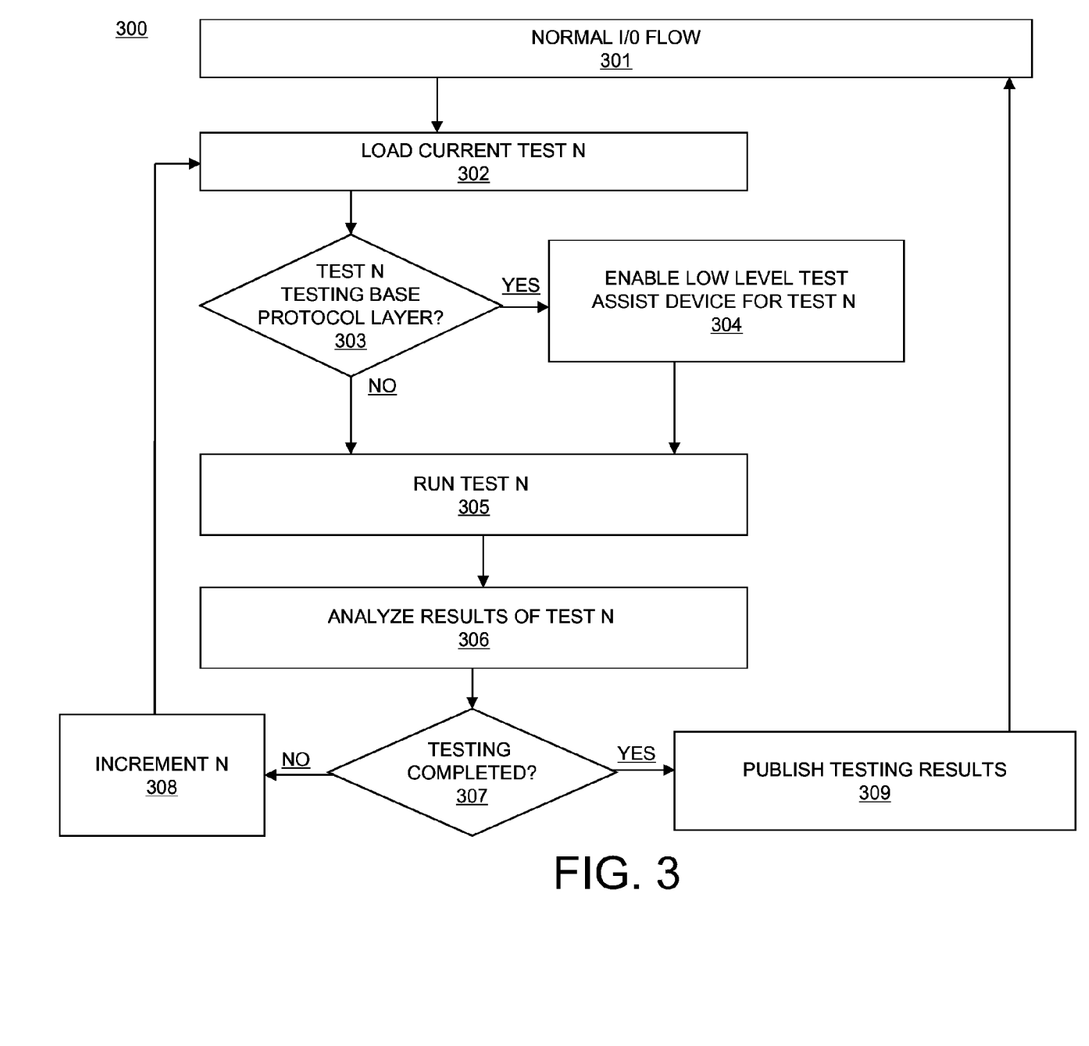
FIG. 3 is a flow diagram of a method of protocol testing using a base protocol layer testing device in accordance with an embodiment.

FIG. 3 is a flow diagram of a method 300 of protocol testing using a base protocol layer testing device in accordance with an embodiment. FIG. 3 is discussed with respect to FIGS. 1 and 2. First, in block 301, the computing system 100/200 performs normal I/O via I/O card 104/204. Then, in block 302, testing of computing system 100/200 is commenced by a user, and a current test N that is to be executed is determined and loaded by modified device driver 103 or ASIC 203. The current test N may be loaded from any appropriate location. Next, in block 303, the current test N is examined to determine the protocol layer(s) that is being tested by the test N, and whether the protocol layer(s) that are being tested by test N includes a base protocol layer (for example, layers 1, 2, or 3). The low level assist device 106/206 is required for any test that involves traffic that is not visible to the device driver 101/201. For example, in a computing system 100/200 that is on a fibre channel (FC) network, if the test is a buffer to buffer credit test, the low level assist device 106/206 would be required because the device driver 101/201 has no visibility into the FC-1 Layer, which is one of the lower layers of the FC protocol. If it is determined in block 303 that the current test N is testing a base protocol layer, flow proceeds from block 303 to block 304, in which the low level assist device 106/206 is enabled via modified device driver 103 or ASIC 203. The enabling of the low level assist device 106/206 may include, but is not limited to, specifying, by a user, one or more specific primitives to drop, modify, or insert in the I/O traffic by the low level assist device 106/206 during the test. Flow of method 300 then proceeds from block 304 to block 305. If it was determined in block 303 that the test N is not testing a base protocol layer and that low level assist device 106/206 is not required for the current test N, then flow of method 300 proceeds directly from block 303 to block 305.

In block 305, the current test N is executed. In embodiments in which the low level test assist device 106/206 was not enabled in block 304, the test N is performed using modified device driver 103 or ASIC 203. In embodiments in which the low level test assist device 106/206 was enabled in block 304, the test N is performed using the low level test assist device 106/206 in conjunction with the modified device driver 103 or ASIC 203, and traffic that passes through the I/O card 104/204 during the test is stored in cache 107/207 in low level test assist device 106/206. The low level test assist device 106/206 may also inject or modify traffic. For example, if a frame of a particular type that is being tested passes through I/O card 104, 204, the low level test assist device 106/206 may modify the frame and then store future traffic in order to determine the results of the modification. In a further example, if the test N is to change the cyclic redundancy check (CRC) frame on a data frame that is being sent to the network 110/210 by I/O card 104/204, the low level test assist device 106/206 may modify the CRC in a frame in the outgoing I/O traffic in I/O card 104/204, and then the modified frame would continue on to its destination. Next, in block 306, after the test N is completed, the results of the test N are analyzed. In embodiments in which the low level test assist device 106/206 was enabled in block 304, the results of the test N are stored in the cache 107/207 and are analyzed by either the post-processor 109 or by the ASIC 203 in various embodiments. The analysis performed in block 306 may be automated in some embodiments.

Flow of method 300 then proceeds to block 307, in which it is determined whether the testing is completed. If it is determined in block 307 that the testing is not completed, flow proceeds from block 307 to block 308, in which variable N is incremented, so that a next test N may be loaded in block 302. From block 308, flow returns to block 302, and blocks 302-306 of method 300, as described above, are repeated for the next test N. If it is determined in block 307 that the testing is completed, flow proceeds from block 307 to block 309, in which the results and analysis of the tests are published. Publication may be performed in block 309 in any appropriate manner. Examples of publishing that may be performed in block 309 may include but are not limited to opening any problems that were identified in a problem tracking database, or emailing or texting the results to a user.

Figure 4:
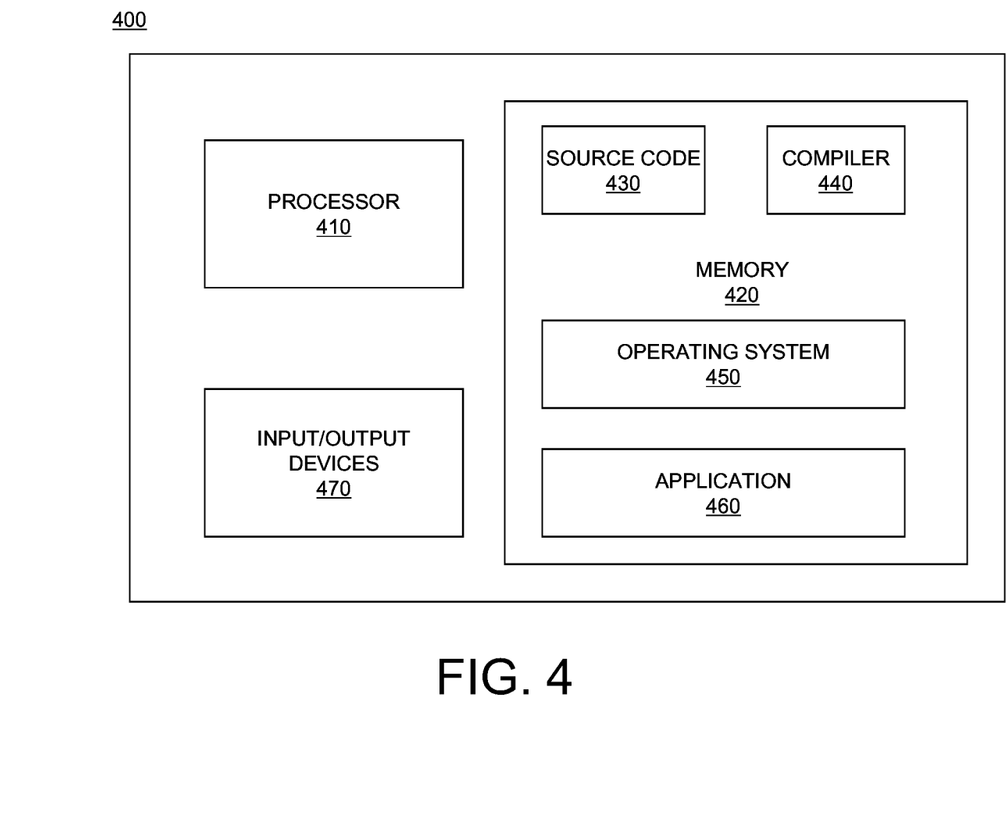
FIG. 4 is a block diagram of a computing system for use with a base protocol layer testing device in accordance an embodiment.

FIG. 4 illustrates an example of a computer 400 which may be utilized in conjunction with a base protocol layer testing device. Various operations discussed above may utilize the capabilities of the computer 400. One or more of the capabilities of the computer 400 may be incorporated in any element, module, application, and/or component discussed herein. For example, embodiments of a base protocol layer testing device may be incorporated into input/output (I/O) devices 470.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), Digital Versatile Disk (DVD), Blu-Ray disk, hard disk, solid state drive (SSD), diskette, cartridge, cassette, or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 4100), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, Python, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Embodiments may take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk, a solid state drive (SSD), and an optical disk. Current examples of optical disks include compact disk read only memory (CD-ROM), compact disk read/write (CD-R/W), DVD, and Blu-Ray disk.

Figure 5:
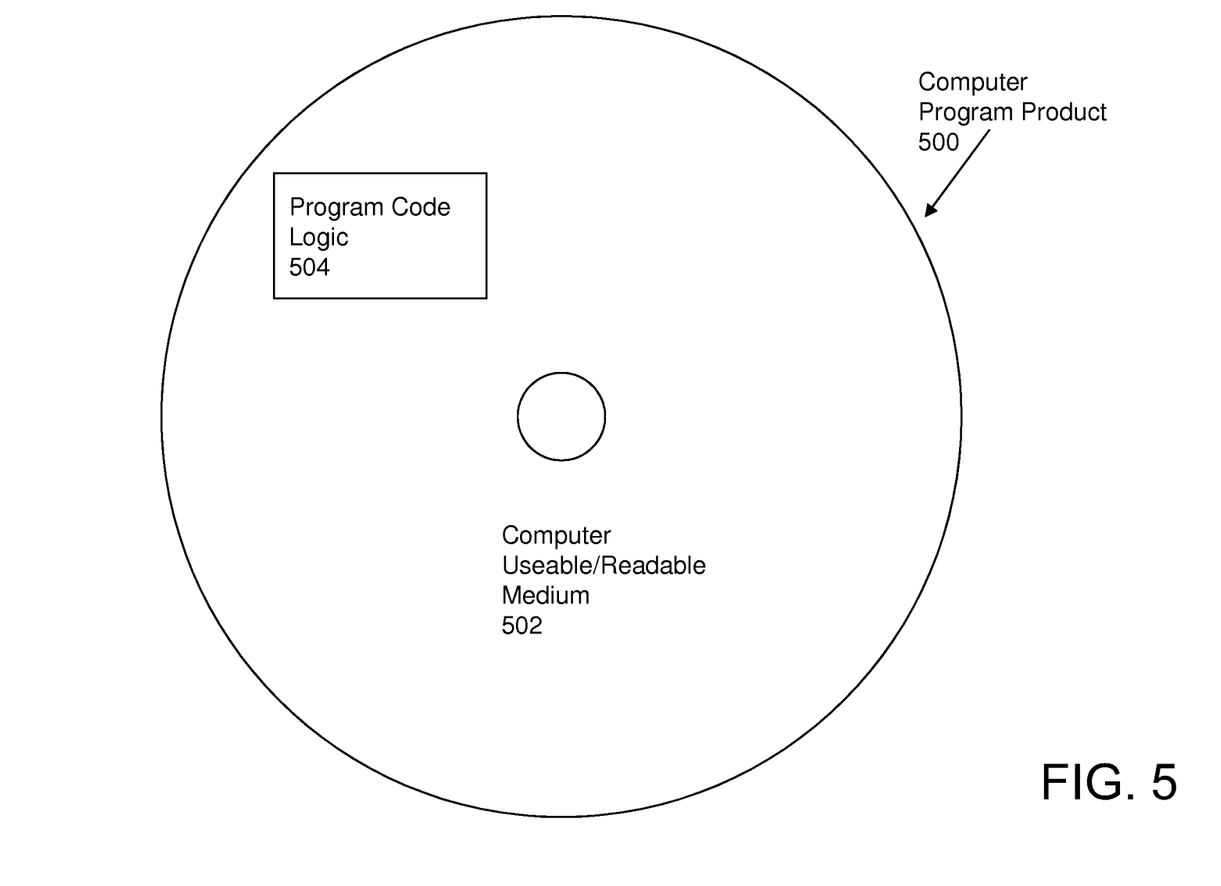
FIG. 5 illustrates a computer program product in accordance with an embodiment.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Improvements and modifications can be made to the foregoing without departing from the scope of the present invention.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of". It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features. In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for testing of a computing system using a base protocol layer testing device, the method comprising:

based on determining, by the base protocol layer testing device, that a current test comprises a test of a base protocol layer of the computing system, enabling a low level test assist device of the base protocol layer testing device for the current test, wherein the low level test assist device comprises a hardware device that is directly attached to an input/output (I/O) card of the computing system;

storing base protocol layer traffic that passes through the I/O card by the low level test assist device during performance of the current test by the base protocol layer testing device; and analyzing the stored base protocol layer traffic after completion of the current test to determine a result of the current test;

wherein the base protocol layer testing device comprises a modified device driver of the I/O card in the computing system;

wherein the stored base protocol layer traffic is visible to the low level test assist device and is not visible to the modified device driver during performance of the current test; and wherein the determining that the current test comprises a test of a base protocol layer of the computing system is performed by the modified device driver.

2. The method of claim 1, wherein the base protocol layer testing device comprises a post-processor that is in communication with the computing system, and wherein the analyzing of the stored base protocol layer traffic is performed by the post-processor.

3. The method of claim 1, wherein the base protocol layer testing device comprises an application-specific integrated circuit (ASIC) in communication with the I/O card in the computing system;

wherein the stored base protocol layer traffic is visible to the low level test assist device and is not visible to the ASIC during performance of the current test; and wherein the determining that the current test comprises a test of a base protocol layer of the computing system is performed by the ASIC.

4. The method of claim 3, wherein the analyzing of the stored base protocol layer traffic is performed by the ASIC.

5. The method of claim 1, wherein the low level test assist device is plugged into a small form-factor pluggable (SFP) port of the I/O card.

6. The method of claim 1, wherein the stored base protocol layer traffic comprises one or more of incoming and outgoing traffic that passes through the I/O card during performance of the current test, and wherein the stored base protocol layer traffic is stored in a cache that is located on the low level test assist device.

7. The method of claim 1, further comprising modifying one or more frames of the base protocol layer traffic that passes through the I/O card by the low level test assist device during performance of the current test.

8. The method of claim 1, further comprising injecting one or more frames into the base protocol layer traffic that passes through the I/O card by the low level test assist device during performance of the current test.

9. A computer program product for testing of a computing system using a base protocol layer testing device, the computer program product comprising a non-transitory computer readable storage medium having computer readable program code embodied therewith, said computer readable program code being executable by a processor to:

based on determining, by the base protocol layer testing device, that a current test comprises a test of a base protocol layer of the computing system, enabling a low level test assist device of the base protocol layer testing device for the current test, wherein the low level test assist device comprises a hardware device that is directly attached to an input/output (I/O) card of the computing system;

storing base protocol layer traffic that passes through the I/O card by the low level test assist device during performance of the current test by the base protocol layer testing device; and     analyzing the stored base protocol layer traffic after completion of the current test to determine a result of the current test;

wherein the base protocol layer testing device comprises a modified device driver of the I/O card in the computing system;

wherein the stored base protocol layer traffic is visible to the low level test assist device and is not visible to the modified device driver during performance of the current test; and     wherein the determining that the current test comprises a test of a base protocol layer of the computing system is performed by the modified device driver.

10. The computer program product of claim 9, wherein the base protocol layer testing device comprises a post-processor that is in communication with the computing system, and wherein the analyzing of the stored base protocol layer traffic is performed by the post-processor.

11. The computer program product of claim 9, wherein the base protocol layer testing device comprises an application-specific integrated circuit (ASIC) in communication with the I/O card in the computing system;

wherein the stored base protocol layer traffic is visible to the low level test assist device and is not visible to the ASIC during performance of the current test; and     wherein the determining that the current test comprises a test of a base protocol layer of the computing system is performed by the ASIC.

\* \* \* \* \*